United States Patent Office 2,830,954
Patented Apr. 15, 1958

2,830,954

POLYAMIDE GREASE COMPOSITION

Joseph A. Dixon, Bellwood, Pa., assignor to California Research Corporation, San Francisco, Calif., a corporation of Delaware No Drawing. Application November 23, 1955
Serial No. 548,751

6 Claims. (Cl. 252—51.5)

This patent application is directed to new grease-thickening agents for the formation of high temperature grease compositions. Specifically, this patent application is directed to high temperature grease compositions thickened with certain particular polyamides.

This application is a continuation-in-part of patent application Serial No. 305,289, filed August 19, 1952 (and now abandoned).

It is becoming more and more apparent that, for the most part, greases must be able to lubricate effectively at high temperatures, that is, temperatures in the range of 350° F. to 500° F., preferably above 400° F. Numerous grease specifications of government agencies and industries now specify grease compositions having minimum dropping points of 400° F. This need for high temperature greases is the result of increased driving power, which increases the speeds of gears, bearings, and other moving parts; increased pressures caused by the development of smaller gears to withstand greater loads than heretofore possible with larger gears, etc.

Greases prepared according to the present invention will maintain grease consistencies at extremely high temperatures; that is, such greases will remain unctuous and not become hard or brittle at temperatures in the range of 350° F. to 500° F.

In the automotive industry, for example, there is the constant desire to manufacture smaller internal combustion engines without sacrificing power output. In fact, many of these smaller engines are designed to deliver greater power than their larger counterparts. The same smaller engines have considerably less bearing surfaces than the larger predecessors, which means that the bearings bear greater loads than before.

Similarly, the continuing trend to manufacture automobiles with lower centers of gravity has made it necessary to use smaller driving gears, particularly in such gear assemblies as the differentials and transmissions. The smaller gears thus used have considerably greater pressures exerted upon them per unit area than gears of older type gear assemblies. The higher loads on bearings and gears demand better thickening agents in grease compositions.

According to the present invention, lubricating oils are thickened to the consistency of grease compositions by incorporating certain polyamides therein.

The polyamides which are set forth herein as grease thickening agents are prepared by first reacting dicarboxylic acids with diamines, wherein the molar ratio of dicarboxylic acids to diamines is less than 1. The dicarboxylic acid-amine reaction products are then further treated with monobasic acids to completely react with (i. e., neutralize) the residual amine groups, thus forming the thickening agents of this invention. A product having residual amine groups is corrosive to metals.

For the sake of brevity, the thickening agents herein will be termed "polyamides," as represented by Formula A hereinbelow.

The reactions involved in the preparation of these thickening agents are exemplified as follows:

Equation 1

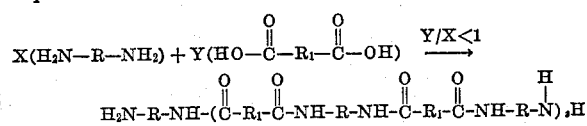
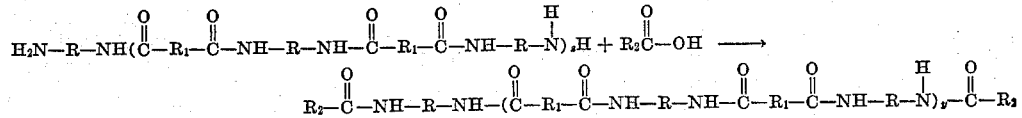

Equation 2

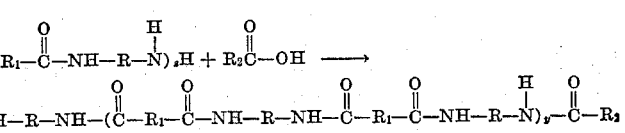

Formula A wherein R, $R_1$ and $R_2$ are aliphatic radicals, Y/X is the molar ratio of dibasic acid to diamine, which ratio has a value less than 1, that is from about 0.25 to about 0.75 (0.5 to 0.75 being preferred).

The R and $R_1$ groups can be polymethylene groups, i. e., $(CH_2)_x$, wherein $x$ is a number from 2 to 10 (4 to 6 being preferred).

The $R_2$ group can be aliphatic groups having from 2 to 22 carbon atoms.

It is preferred that R is a hexamethylene radical, that $R_1$ is a tetramethylene radical, and that $R_2$ is an aliphatic radical containing from 12 to 18 carbon atoms.

Examples of R and $R_1$ groups include dimethylene, trimethylene, hexamethylene, octamethylene, decamethylene, etc.

Examples of the $R_2$ radical include the following: propyl, propenyl, butyl, hexyl, octyl, octenyl, nonyl, decyl, dodecyl, dodecenyl, tetradecyl, hexadecyl, octadecyl, eicosyl; radicals derived from petroleum hydrocarbons such as white oil, olefin polymers, etc.

Lubricating oils which are suitable base oils for the grease composition of this invention include a wide variety of lubricating oils, such as naphthenic base, paraffin base, and mixed base; other hydrocarbon lubricants, e. g., lubricating oils derived from coal products, and synthetic oils, e. g., alkylene polymers (such as polymers of propylene, butylene, etc., and mixtures thereof), alkylene oxide type polymers, dicarboxylic acid esters, liquid esters of acids of phosphorus, alkyl benzene polymers, polymers of silicon, etc. Synthetic oils of the alkylene oxide type polymers which may be used include those exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol; esters of ethylene oxide type polymers, e. g., acetylated propylene oxide polymers prepared by acetylating propylene oxide polymers containing hydroxyl groups; polyethers prepared from the alkylene glycols, e. g., ethylene glycol, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxyl groups can be removed during the polymerization reaction by esterification or etherification.

Synthetic oils of the dicarboxylic acid ester type include those which are prepared by esterifying such dicarboxylic acids as adipic acid, azaleic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dicarboxylic acid ester synthetic oils include dibutyl adipate, dihexyl adipate, di-2-ethylhexyl sebacate, di-n-hexyl fumaric polymer.

Synthetic oils of the alkyl benzene type include those which are prepared by alkylating benzene (e. g., dodecyl benzene, tetradecyl benzene, etc.).

Synthetic oils of the type of liquid esters of acids of phosphorus include the esters of phosphoric acid, e. g., tricresyl phosphate; the esters of phosphonic acid, e. g., the diethyl ester of decanephosphonic acid, etc.

Synthetic oils of the type of polymers of silicon include the liquid esters of silicon and the polysiloxanes. The liquid esters of silicon and the polysiloxanes include those exemplified by tetraethyl silicate, tetraisopropyl silicate, tetra(methyl-2-butyl) silicate, tetra(4-methyl-2-penta) silicate, tetra(1-methoxy-2-propyl) silicate, hexyl-(4-methyl-2-pentoxy) disiloxane, poly(methylsiloxane), poly(methylphenylsiloxane), etc.

The above base oils may be used individually as such, or in various combinations, wherever miscible or wherever made so by the use of mutual solvents.

The values of "z" in the above equations are not fixed values for any one reaction. It is understandable to those skilled in the art that, although "z" is an integer, it varies for any one given reaction. The "average" value for "z" varies from about 1.5 to about 4. However, the value of "z" is never of such magnitude as to permit the particular polyamides of this invention to have molecular weights in excess of 1000. That is, the polyamides of this particular invention have molecular weights less than 1000.

In contrast thereto, the dibasic acid-diamine polymers of the nylon art are synthetic fiber-forming polyamides having molecular weights in excess of 10,000. This is set forth on pages 118 and 220 in "Fibers for Synthetic Polymers," by Rowland Hill, published by Elsevier Publishing Company, 1953. On page 118 it is stated that: "The word 'nylon' is not a trade name, but a word coined as a generic term for synthetic fiber-forming polyamides." On page 220, it is stated that the molecular weights of synthetic fiber-forming polyamides usually exceed 10,000.

As is well known in the art, it is characteristic of bifunctional reactants similar to the diamines and the dibasic acids herein that polymers of infinite length can be produced when the proper mol ratios of the reactants are present. When the diamines and dibasic acids are present in stoichiometric amounts, the resulting polymers are of synthetic fiber-forming polymers which are not oil dispersible. However, when the mol ratios of dibasic acids to diamines have values less than 1, the resulting polymeric compounds are oil dispersible.

The grease-thickening agents of this invention are used in amounts sufficient to thicken the lubricating oil to the consistency of a grease; that is, in amounts of 6% to 50%, by weight; however, 10% to 30% is preferred.

Examples 1 and 2 hereinbelow illustrate attempted preparation of grease compositions from nylon polyamides.

*Example 1.—Attempted grease preparation from nylon 66*

A mixture of 25 grams of nylon 66 (i. e., a nylon prepared from hexamethylene diamine and adipic acid) and 75 grams of a California naphthenic base oil having a viscosity of 450 SSU at 100° F. was heated to a temperature of 475° F. with violent agitation. The nylon melted in the temperature range of 400–450° F. However, the nylon was not miscible with the oil, even at the top temperature. When the mixture was cooled to room temperature, the nylon separated out as a solid cake.

*Example 2.—Attempted grease preparation from nylon 610*

A mixture of 25 grams of nylon 610 (i. e., a nylon prepared from hexamethylene diamine and sebacic acid) and 75 grams of a California naphthenic base oil having a viscosity of 450 SSU at 100° F. was heated to a temperature of 475° F. The nylon melted in the temperature range of 400–450° F. However, the nylon was not miscible with the oil, even at the top temperature. When the mixture was cooled to room temperature, the nylon separated out as a solid cake.

The following examples illustrate the preparation of polyamides of the present invention and grease compositions therefrom.

*Example 3*

A mixture of 145 grams (1.0 mol) hexamethylene diamine (75% solution in water) and 73 grams (0.5 mol) of adipic acid was slowly heated with stirring. Water of reaction began to come from the reaction mixture at 240° F. 20 minutes later the temperature had reached 390° F., at which temperature the water of reaction ceased. To this reaction mixture 284 grams (1.0 mol) of stearic acid was added at temperatures ranging from 390–430° F. The reaction mixture was heated for an additional 5 minutes at 430° F. The cooled reaction product was a tan solid.

30 grams of the above reaction mixture (i. e., the tan solid) and 170 grams of a California solvent-refined naphthenic base oil having a viscosity of 450 SSU at 100° F. were heated, with stirring, to 470° F. This mixture was cooled to room temperature and milled through a 200-mesh screen. The resulting grease had a dropping point of 357° F. and an ASTM worked penetration of 317 (i. e., after 60 strokes).

The thickening agents herein remarkably resist oxidation and rusting action. Greases prepared therefrom are highly resistant to oxidation and rusting.

In addition to the grease thickening agents of this invention, the grease composition may include other agents which will further enhance resistance to oxidation, other extreme pressure characteristics, resistance to wear; agents which serve as color correctors, rust inhibitors, thickening agents, etc.

I claim:

1. A grease composition comprising a major proportion of a lubricating oil and, in an amount sufficient to thicken said lubricating oil to the consistency of a grease, a grease thickening agent obtained by first forming a polyamide having terminal amine groups by reacting aliphatic dibasic acids containing from 4 to 12 carbon atoms and aliphatic diamines containing from 2 to 22 carbon atoms, wherein the mol ratio of said dibasic acids to said diamines has a value from 0.25 to 0.75, followed by reacting the resulting polyamide with aliphatic monocarboxylic acids containing from 3 to 23 carbon atoms in an amount sufficient to form an amide with the residual amine groups of said polyamide, the resulting grease thickening agent having a molecular weight less than 1000.

2. A grease composition comprising a major proportion of a lubricating oil and, in an amount sufficient to thicken said lubricating oil to the consistency of a grease, a grease thickening agent obtained by first forming a polyamide having terminal amine groups by reacting aliphatic dibasic acids containing from 6 to 8 carbon atoms and aliphatic diamines containing from 4 to 6 carbon atoms, wherein the mol ratio of said dibasic acids to said diamines has a value from 0.25 to 0.75, followed by reacting the resulting polyamide with aliphatic monocarboxylic acids containing from 3 to 23 carbon atoms in an amount sufficient to form an amide with the residual amine groups of said polyamide, the resulting grease thickening agent having a molecular weight less than 1000.

3. A grease composition comprising a major proportion of a lubricating oil and, in an amount sufficient to thicken said lubricating oil to the consistency of a grease, a grease thickening agent obtained by forming a polyamide having terminal amine groups by reacting adipic acid and hexamethylene diamine, wherein the mol ratio of adipic acid to said diamine has a value from 0.5 to 0.75, followed by reacting the resulting adipic acid-hexamethylene diamine polyamide with an aliphatic monocarboxylic acid containing from 3 to 23 carbon atoms in an amount sufficient to form an amide with the residual amine groups of said polyamide, the resulting grease thickening agent having a molecular weight less than 1000.

4. A grease composition comprising a major proportion of a lubricating oil and, in an amount sufficient to thicken said lubricating oil to the consistency of a grease, a grease thickening agent obtained by forming a polyamide having terminal amine groups by reacting adipic acid and hexamethylene diamine, wherein the mol ratio of adipic acid to said diamine has a value from 0.5 to 0.75, followed by reacting the resulting adipic acid-hexamethylene diamine polyamide with stearic acid in an amount sufficient to form an amide with the residual amine groups of said polyamide, the resulting grease thickening agent having a molecular weight less than 1000.

5. A grease composition comprising a major proportion of a lubricating oil and from 6% to 50% by weight of a grease thickening agent obtained by forming a polyamide having terminal amine groups by reacting adipic acid and hexamethylene diamine, wherein the mol ratio of adipic acid to said diamine has a value of 0.5 to 0.75, followed by reacting the resulting adipic acid-hexamethylene diamine polyamide with stearic acid in an amount sufficient to form an amide with the residual amine groups of said polyamide, the resulting grease thickening agent having a molecular weight less than 1000.

6. A grease composition comprising a major proportion of a lubricating oil and from 10% to 30% by weight of a grease thickening agent obtained by forming a polyamide having terminal amine groups by reacting adipic acid and hexamethylene diamine, wherein the mol ratio of adipic acid to said diamine has a value of 0.5 to 0.75, followed by reacting the resulting adipic acid-hexamethylene diamine polyamide with stearic acid in an amount sufficient to form an amide with the residual amine groups of said polyamide, the resulting grease thickening agent having a molecular weight less than 1000.

References Cited in the file of this patent

UNITED STATES PATENTS

| | | |
|---|---|---|
| 2,594,286 | Bryant et al. | Apr. 29, 1952 |
| 2,604,449 | Bryant et al. | July 22, 1952 |